(12) United States Patent
Nakayama et al.

(10) Patent No.: US 9,381,638 B2
(45) Date of Patent: Jul. 5, 2016

(54) POWER TOOL

(75) Inventors: Ai Nakayama, Hitachinaka (JP); Toshihiko Tachibana, Hitachinaka (JP); Yasuo Etou, Hitachinaka (JP); Miyoji Onose, Hitachinaka (JP); Hiroshi Yamaguchi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 602 days.

(21) Appl. No.: 13/698,416

(22) PCT Filed: Jun. 6, 2011

(86) PCT No.: PCT/JP2011/063432
§ 371 (c)(1),
(2), (4) Date: Nov. 16, 2012

(87) PCT Pub. No.: WO2011/155625
PCT Pub. Date: Dec. 15, 2011

(65) Prior Publication Data
US 2013/0068492 A1    Mar. 21, 2013

(30) Foreign Application Priority Data
Jun. 8, 2010   (JP) ................. 2010-130971

(51) Int. Cl.
*B25F 5/02* (2006.01)
*B25F 5/00* (2006.01)
*A01D 69/02* (2006.01)

(52) U.S. Cl.
CPC ... *B25F 5/00* (2013.01); *B25F 5/02* (2013.01); *A01D 69/025* (2013.01)

(58) Field of Classification Search
CPC ..... A01D 42/00; A01D 69/02; A01D 69/025; A01D 34/37; A01D 34/58; A01D 34/81; B25F 5/00; B25F 5/02

USPC .................................................. 173/184, 217
See application file for complete search history.

(56) References Cited

U.S. PATENT DOCUMENTS 4,835,410 A    5/1989  Bhagwat et al.
4,876,490 A *  10/1989 Kolb ............................... 318/17
(Continued)

FOREIGN PATENT DOCUMENTS

CN    200959753 Y    10/2007
CN    201430783 Y    3/2010
(Continued)

OTHER PUBLICATIONS

International Search Report for application PCT/JP2011/063432 (Nov. 29, 2011).
(Continued)

*Primary Examiner* — Hemant M Desai
*Assistant Examiner* — Valentin Neacsu
(74) *Attorney, Agent, or Firm* — Kilpatrick Townsend & Stockton LLP

(57) ABSTRACT

The present invention provides a power tool that can be used at a position away from the external power source. The power tool includes a housing, a motor, an end tool, a battery pack, and an inverter. The housing has an upper side portion and a lower side portion. The motor is supported by the housing and driven by alternate-current power. The end tool is supported by the housing and rotatably driven by the motor. The battery pack outputs direct-current voltage. The inverter is disposed on the upper side portion and at a position higher than the motor and configured to convert the direct-current voltage outputted from the battery pack into alternate-current voltage and to supply the motor with alternate-current power.

12 Claims, 13 Drawing Sheets

(56) References Cited

U.S. PATENT DOCUMENTS

| | | | | |
|---|---|---|---|---|
| 5,606,851 | A | * | 3/1997 | Bruener et al. ............... 56/11.9 |
| 5,686,807 | A | * | 11/1997 | Kusano ............... B60L 11/1803 318/432 |
| 5,982,138 | A | * | 11/1999 | Krieger ........................ 320/105 |
| 6,591,593 | B1 | * | 7/2003 | Brandon et al. ............... 56/10.6 |
| 6,666,008 | B2 | * | 12/2003 | Iida et al. ....................... 56/11.9 |
| 7,330,006 | B2 | | 2/2008 | Iwata et al. |
| 7,339,287 | B2 | * | 3/2008 | Jepsen ............... H02M 7/4807 307/82 |
| 7,479,754 | B2 | * | 1/2009 | Lucas et al. .................. 318/599 |
| 2003/0164645 | A1 | | 9/2003 | Crandell |
| 2004/0169497 | A1 | * | 9/2004 | Colley ..................... H02J 3/02 323/212 |
| 2008/0088266 | A1 | * | 4/2008 | Lucas et al. .................. 318/441 |
| 2008/0218111 | A1 | * | 9/2008 | Okamura ............... H02P 6/142 318/453 |
| 2010/0181966 | A1 | | 7/2010 | Sakakibara |
| 2013/0293197 | A1 | | 11/2013 | Sakakibara |

FOREIGN PATENT DOCUMENTS

| | | |
|---|---|---|
| DE | 4301508 A1 | 7/1994 |
| EP | 1715565 A1 | 10/2006 |
| JP | 03-503986 A | 9/1991 |
| JP | 11-346530 A | 12/1999 |
| JP | 3100620 U | 1/2004 |
| JP | 2009-071976 A | 4/2009 |
| JP | 2009-219428 A | 10/2009 |

OTHER PUBLICATIONS

Japan Patent Office action for application JP2010-130971 (Feb. 6, 2014).

China Intellectual Property Office office action for application CN201180028469.0 dated Jun. 25, 2014.

International Report on Patentability for application PCT/JP2011/063432(Dec. 20, 2012).

* cited by examiner

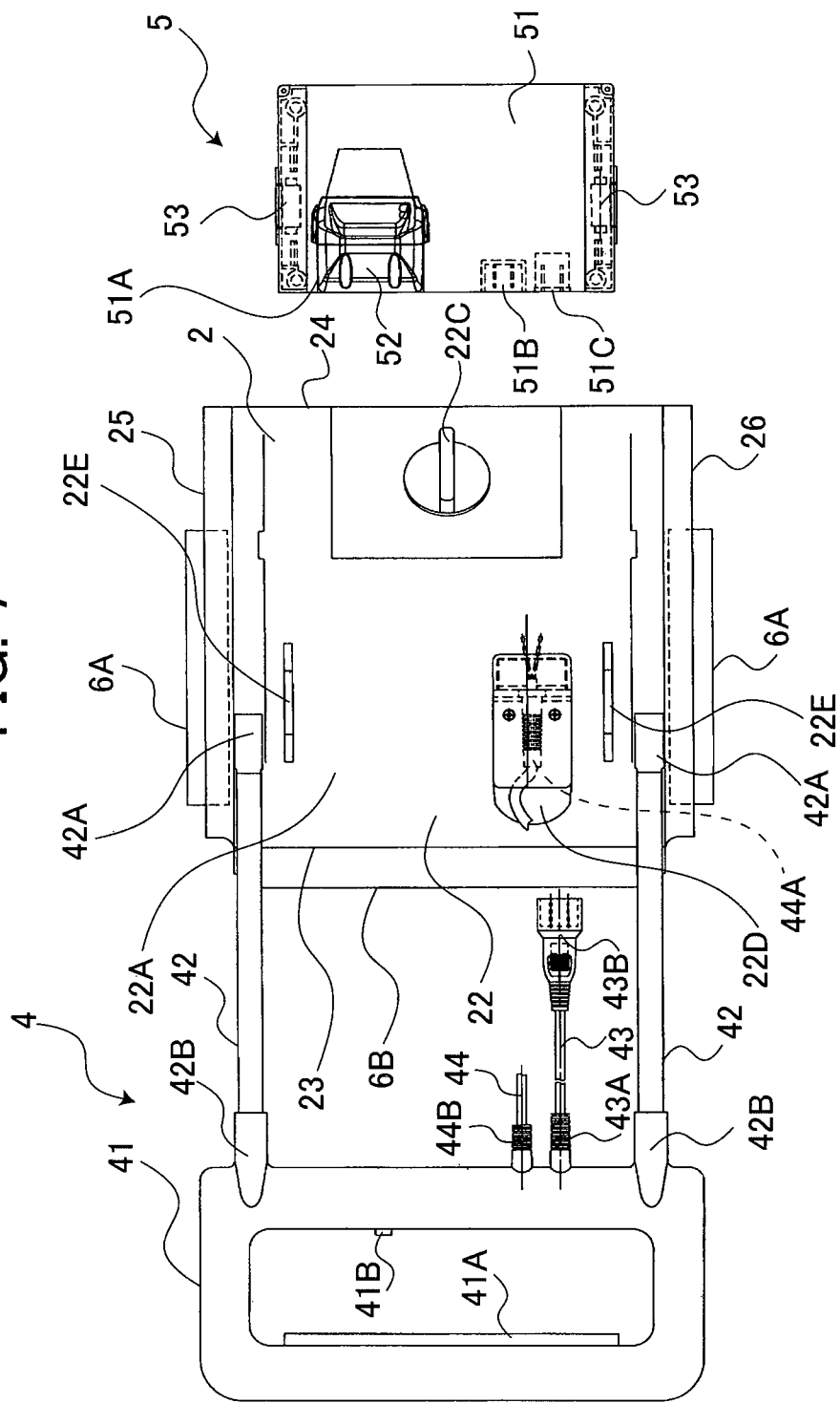

POWER TOOL

CROSS REFERENCE TO RELATED APPLICATION

This application claims priority from Japanese Patent Application No. 2010-130971 filed Jun. 8, 2010. The entire content of this priority application is incorporated herein by reference.

TECHNICAL FIELD

The invention relates to a power tool having a motor driven by an alternating-current power source.

BACKGROUND ART

A power tool driven by an AC (alternating current) motor is conventionally known. Since the AC motor in such a power tool is supplied with electric power from an external power source, the power tool is used while being connected to the external power source via a power cord. This kind of power tool is described in Japanese Patent Application Publication No. 2009-219428.

CITATION LIST

Patent Literature

PLT1: Japanese Patent Application Publication No. 2009-219428

SUMMARY OF INVENTION

Technical Problem

According to the above-described configuration, however, there has been a problem that the power tool can only be used within the reach of the power cord connected to the external power source.

In view of the above, it is an objective of the invention to provide a power tool that can be used even at locations away from an external power source.

Solution to Problem

This and other objects of the present invention will be attained by a power tool including a housing, a motor, an end tool, a battery pack, and an inverter. The housing has an upper side portion and a lower side portion. The motor is supported by the housing and driven by alternate-current power. The end tool is supported by the housing and rotatably driven by the motor. The battery pack outputs direct-current voltage. The inverter is disposed on the upper side portion and at a position higher than the motor and configured to convert the direct-current voltage outputted from the battery pack into alternate-current voltage and to supply the motor with alternate-current power.

With this configuration, the end tool can be urged downward by the inverter having a weight, thereby improving operability of the power tool. Especially, this invention is particularly effective in a lawnmower.

Further, the inverter is arranged at an upper position than the motor, which prevents the inverter unit from being hit by another object during use. Especially, when the power tool is a lawnmower, the lower side portion confronts the ground surface during use of the lawnmower. Thus, if the inverter is provided on the lower side portion, there is possibility that the inverter hits the ground surface, stones, and the like. This can be avoided according to this configuration. Further, when maintenance work is performed for the inverter, the motor does not get in the way.

It is preferable that the housing has a front wall section and a rear wall section and that the inverter is located between the motor and the end tool in a direction from the rear wall section to the front wall section.

With this configuration, if the motor and the end tool have relatively large weight, weight balance can be improved with a relatively large weight of the inverter.

It is preferable that the inverter is located directly above the end tool.

With this configuration, because the inverter is located directly above the end tool, the end tool can be urged downward by the inverter having a relatively large weight. Especially, in a case of a lawnmower, this can prevent the end tool from lifting from the ground surface, and prevent the end tool from becoming unstable during lawn mowing.

It is preferable that the housing has a front wall section and a rear wall section in a traveling direction of the power tool and that the inverter is disposed forward of the rear wall section in the traveling direction.

It is preferable that the housing has a front part and a rear part in the traveling direction of the power tool and that the power tool further includes at least one front wheel rotatably supported by the front part and rotatable about a front rotational axis and at least one rear wheel rotatably supported by the rear part and rotatable around a rear rotational axis, the inverter being disposed forward of the rear rotational axis.

With the above-described configurations, it can suppress falling over of the power tool rearward due to a relatively large weight of the inverter. Especially, in a case of a lawnmower, the power tool is sometimes leaned rearward in order to adjust cutting depth into lawn. In such a situation, this configuration can effectively suppress falling over of the power tool rearward.

It is preferable that the inverter is located between the rear rotational axis and the front rotational axis in the traveling direction.

With this configuration, it can suppress falling over of the power tool rearward due to a relatively large weight of the inverter. Especially, in a case of a lawnmower, the power tool is sometimes leaned rearward in order to adjust cutting depth into lawn. In such a situation, this configuration can effectively suppress falling over of the power tool rearward.

It is preferable that the upper side portion of the housing has an uppermost surface on which the inverter is mounted.

With this configuration, the inverter can be arranged at a position away from a part where an adjustment knob and switches, which enables effective utilization of dead space.

It is preferable that the power tool further comprises a holding section configured to be held by a user, and a pair of arm sections each having a base end pivotally connected to the housing and another end connected to the holding section so that the pair of arm sections are pivotally movable relative to the housing. Pivotal movement of the pair of arm section defines loci. A pair of imaginary planes including the loci is defined. The inverter is disposed between the pair of imaginary planes.

With this configuration, because the pair of arm sections is pivotally moveable relative to the housing, the holding section can be oriented at a position that is easy for the user to work. Further, the inverter is disposed between the pair of imaginary planes including the loci formed when the pair of arm sections is pivotally moved, which prevents the inverter and the pair of arm sections from contacting each other and being broken when the pair of arm sections is pivotally moved relative to the housing.

It is preferable that the inverter is detachably provided to the housing.

With this configuration, because the battery pack is detachable from the inverter, it is not necessary to carry the inverter together with the battery pack to a charging place when the charging-type battery pack is to be charged. In addition, the battery pack can be used for another power tool.

It is preferable that the base end contains a pivotal axis of the pivotal movement of the pair of arm sections, that the upper side portion of the housing is provided with an engaging section, that the inverter is provided with an engaged section engageable with the engaging section to fix the inverter to the upper side portion, and that wherein the pair of arm sections extends rearward and diagonally upward from the housing, the engaged portion being positioned at the upper side surface and forward of each base end of each arm section.

With this configuration, when engagement/disengagement of the engaging section to/from the engaged section during use of the power tool, the pair of arm sections can be prevented from hindering engagement/disengagement work. This configuration is particularly effective in disengagement work performed due to elastic deformation of the engaged section.

Advantageous Effects of Invention

As described above, it is possible to provide a power tool that can be used at a position away from the external power source.

BRIEF DESCRIPTION OF DRAWINGS

In the drawings;

FIG. 7 is a plan view showing the power tool according to the embodiment in a state where the inverter separates from the housing and the pair of arm sections is in the rearward inclining state;

DESCRIPTION OF EMBODIMENTS

Figure 1:
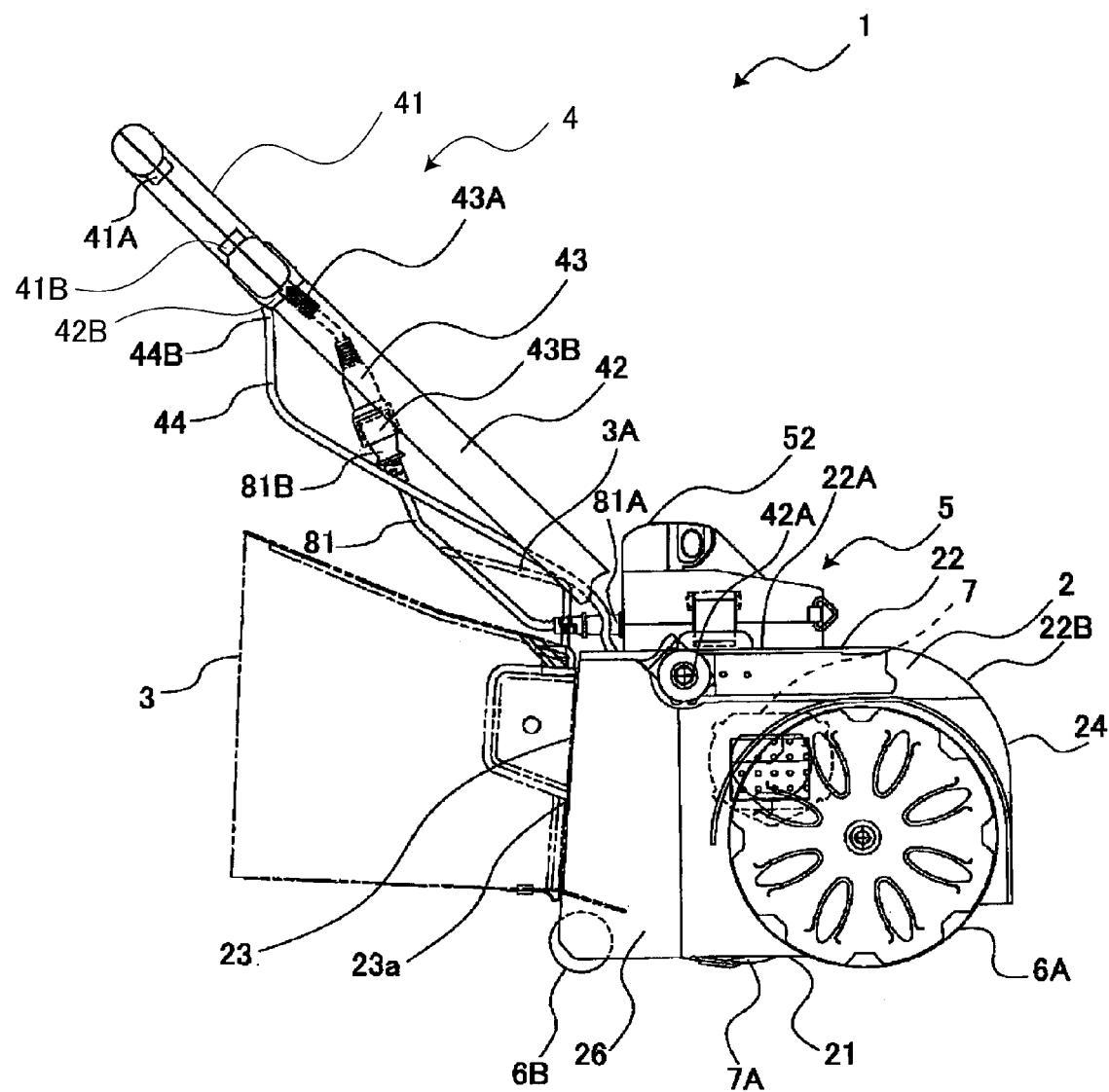
FIG. 1 is a side view of a power tool according to an embodiment of the present invention.

A power tool according to an embodiment of the invention will be described with reference to FIGS. 1 through 8(c). As shown in FIG. 1, a power tool 1 is specifically a lawn mower in this example. The power tool 1 includes a housing 2, a grass-collecting bag 3 detachably provided on the housing 2, a handle 4 extending from the housing 2, an inverter unit 5, front wheels 6A and rear wheels 6B rotatably supported by the housing 2, and a motor 7.

Hereinafter, for the description purposes, the left side in the drawing sheet of FIG. 1 is defined as the rear side, the right side in the drawing sheet is defined as the front side, the upper side in the drawing sheet is defined as the upper side, and the lower side in the drawing sheet is defined as the lower side. Further the drawing sheet of FIG. 1 is a right side view of the power tool 1 showing the right side of the power tool 1 with the left side of the power tool 1 hidden from view. Also, the direction from the rear side to the front side is defined as the traveling direction.

Figure 2:
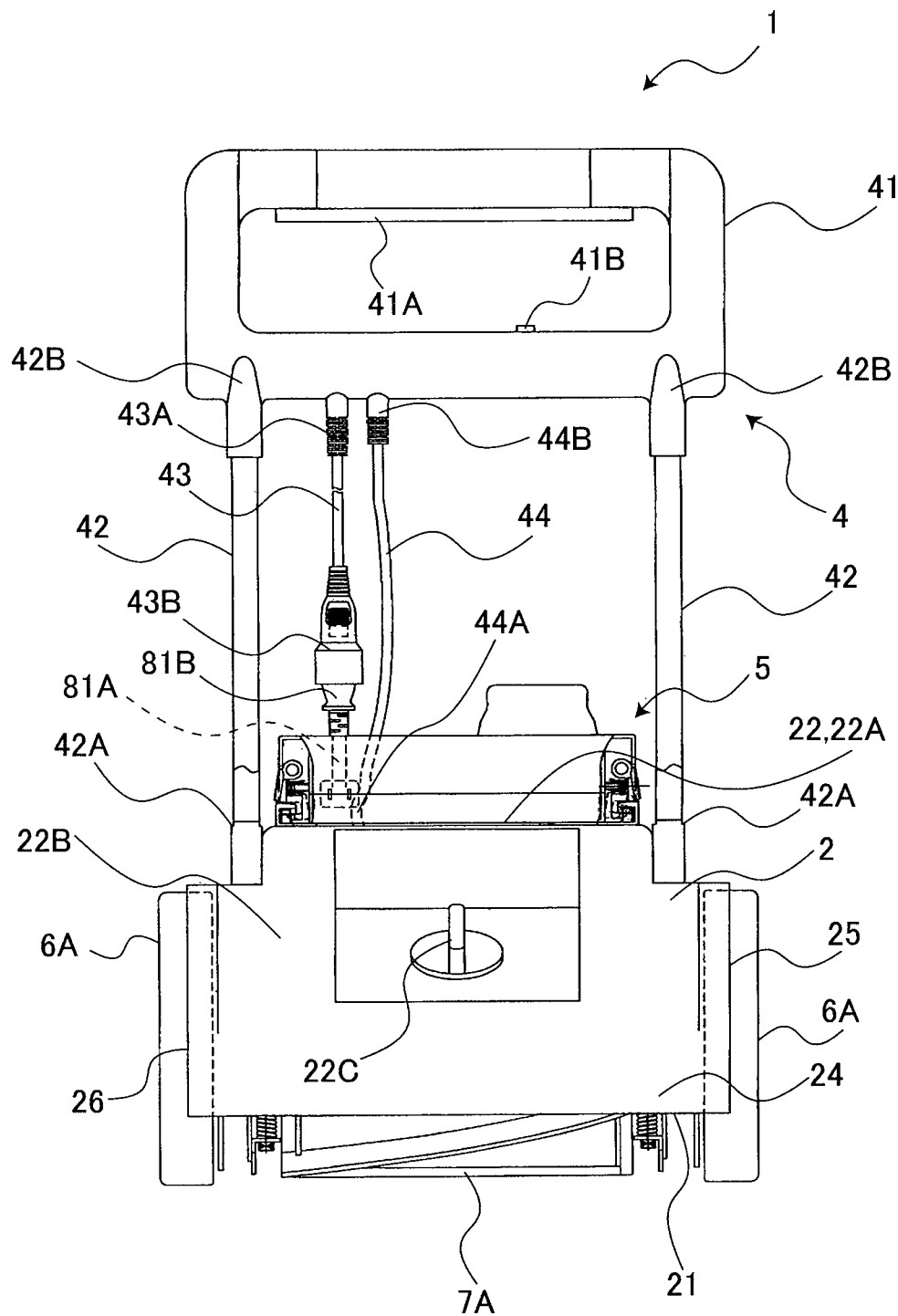
FIG. 2 is a front view of the power tool according to the embodiment.
Figure 3:
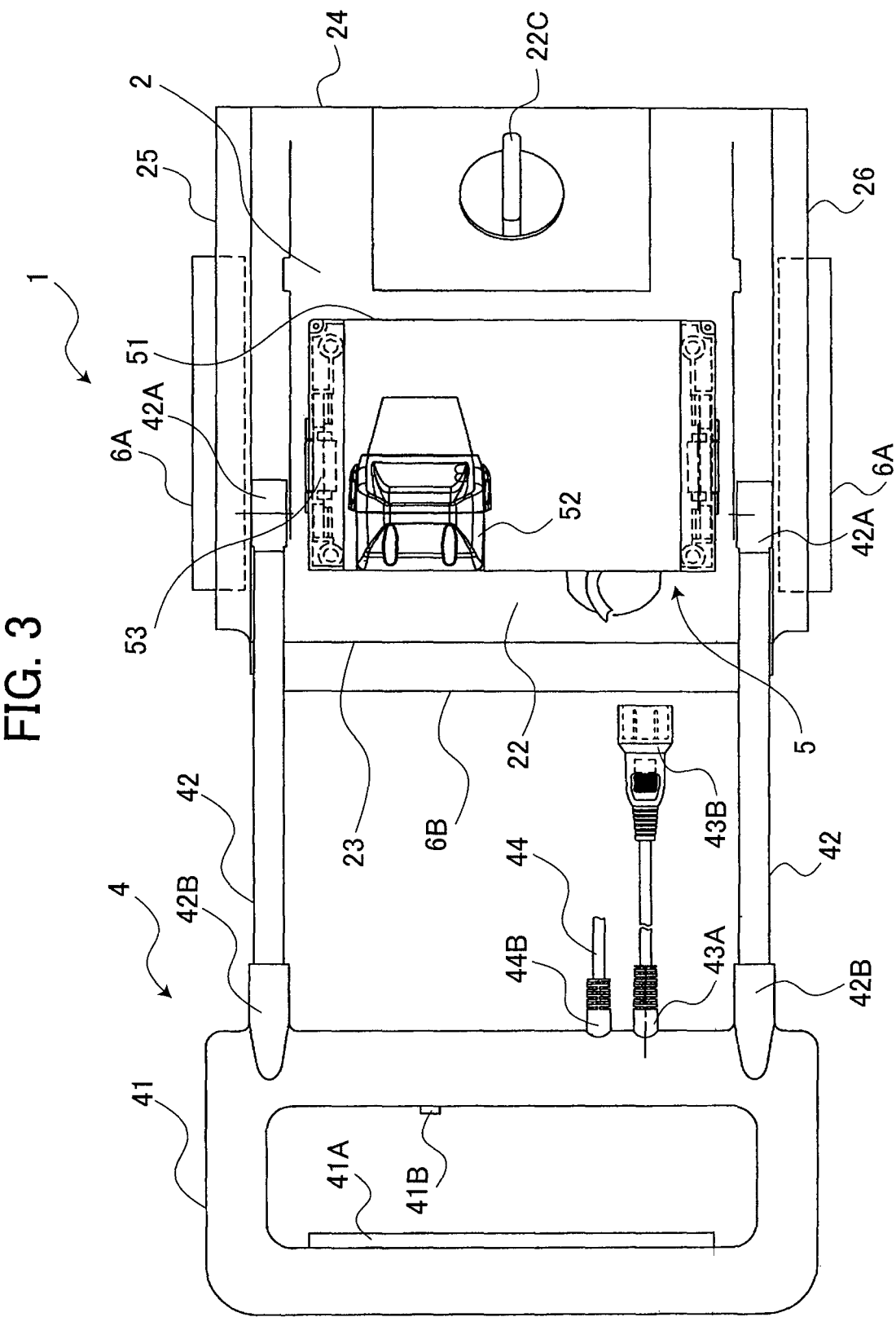
FIG. 3 is a plan view of the power tool according to the embodiment in a state where a pair of arm sections of the power tool are in a rearward inclining state.
Figure 4:
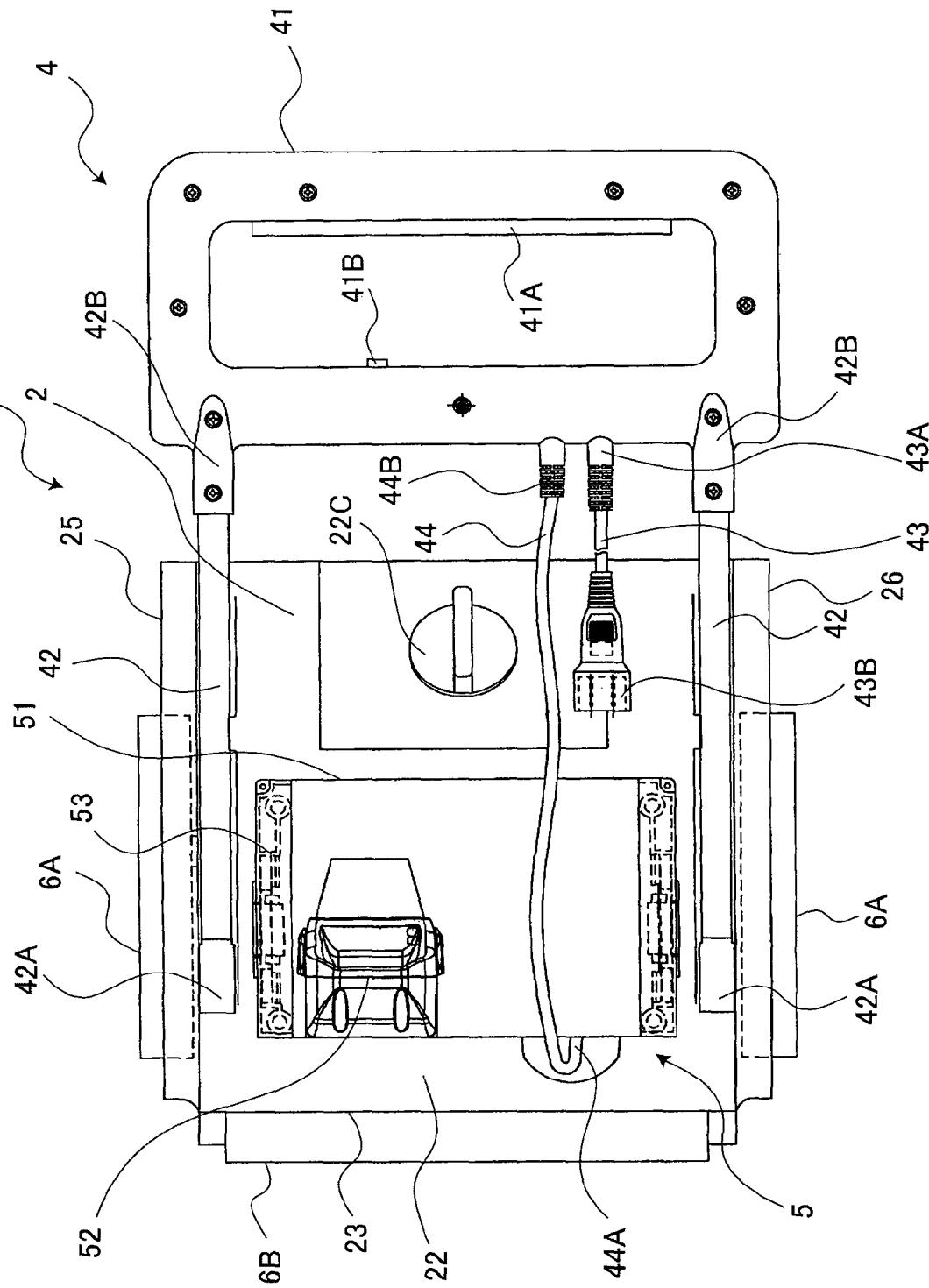
FIG. 4 is a plan view of the power tool according to the embodiment in a state where the pair of arm sections is in a front folding state.
Figure 5:
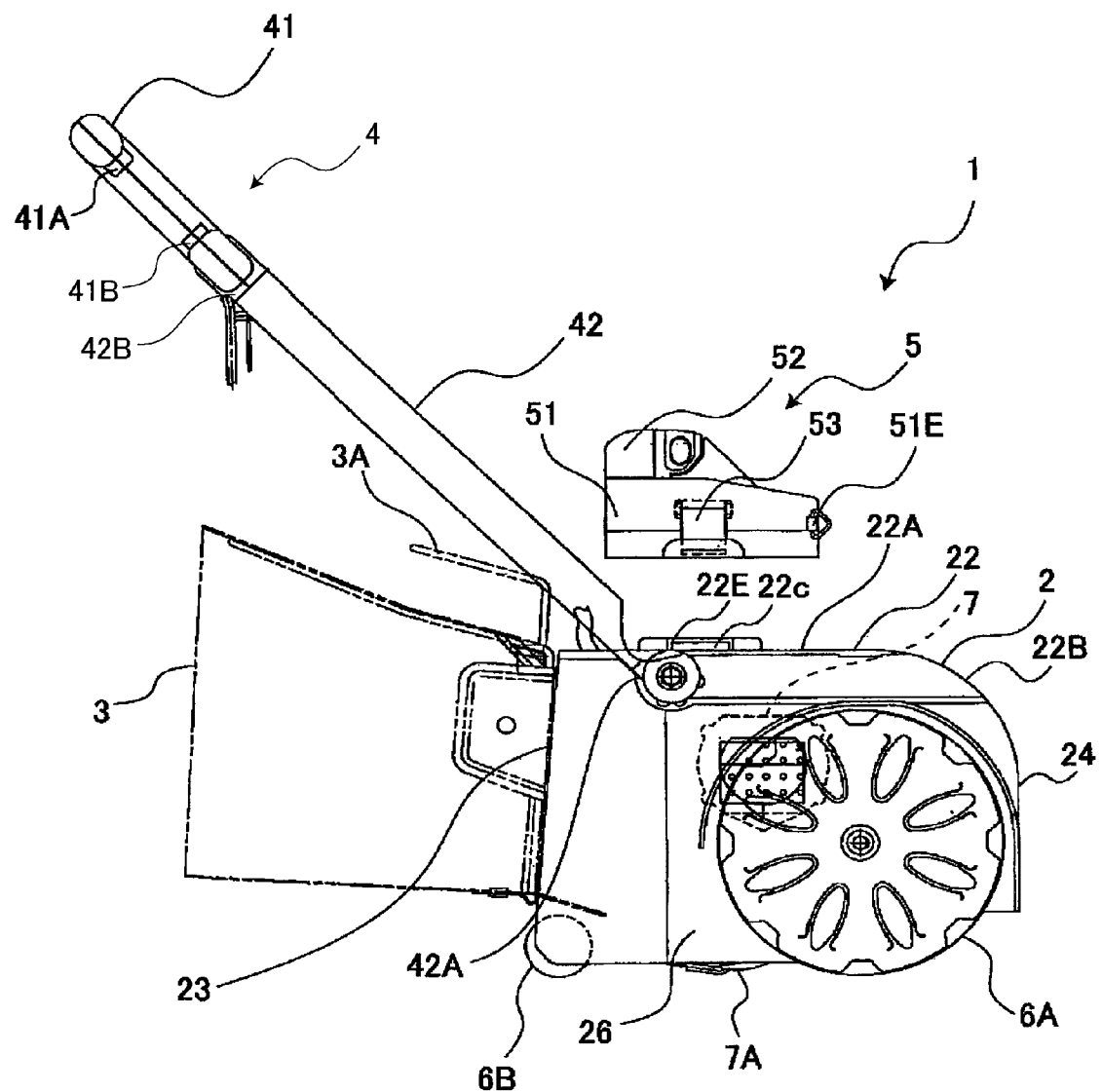
FIG. 5 is a side view of the power tool according to the embodiment in a state where an inverter unit separates from a housing.

The housing 2 includes a lower section 21 that confronts the ground surface when the power tool 1 is used, an upper section 22 located vertically upward from the lower section 21 when the power tool 1 is used, a rear wall section 23 located at the rear side, a front wall section 24 located at the front side, a left wall section 25 located at the left side (FIG. 2 etc.), and a right wall section 26 located at the right side. The lower section 21 and the upper section 22 are connected by the rear wall section 23 and the front wall section 24, the left wall section 25, and the right wall section 26. The upper section 22 has a top flat surface 22A and a curved surface section 22B. The top flat surface 22A forms the uppermost part of the housing 2, and is formed by a flat surface. The curved surface section 22B is located forward from the top flat surface 22A, and is formed by a surface curving gradually from the horizontal direction to the vertical direction. As shown in FIG. 2, an adjustment knob 22C is provided on the curved surface section 22B. The adjustment knob 22C is for adjusting height of the front end of the lower section 21 from the ground surface by pivotally moving the housing 2 about a rear-wheel rotational axis (not shown) to be described later, thereby adjusting cutting depth of a rotary blade (reel) 7A into lawn. Here, the rotary blade 7A serves as an end tool which is an end section to which a driving force is transmitted from the motor 7 as will be described later.

The housing 2 rotatably supports both of the large-diameter front wheels 6A that are provided as a left and right pair and the small-diameter rear wheels 6B that are also provided as a left and right pair. The housing 2 is capable of traveling on the ground surface (lawn) by the front wheels 6A and the rear wheels 6B. The pair of front wheels 6A is rotatable about a front-wheel rotational axis (not shown), and the pair of rear wheels 6B is rotatable about the rear-wheel rotational axis (not shown).

A discharge opening 23a is formed on the rear wall section 23 of the housing 2. The grass-collecting bag 3 is detachably mounted on the rear wall section 23 of the housing 2 so as to close the discharge opening 23a. A handle 3A is attached to the front upper end of the grass-collecting bag 3.

The housing 2 accommodates therein the motor 7 serving as the driving source and the rotary blade 7A serving as the end tool rotatably driven by the motor 7. The motor 7 is supported by the housing 2 so that an output shaft (not shown) extends in the left-right direction. The output shaft (not shown) of the motor 7 is located further rearward than the front-wheel rotational axis (not shown). The motor 7 is a so-called AC motor that is driven by AC voltage. A pulley (not shown) is provided coaxially on the output shaft (not shown) so as to be rotatable together with the output shaft.

The rotary blade 7A has a substantially cylindrical shape, and is rotatably supported by the housing 2 so that its axial center extends in the left-right direction. The axial center of the rotary blade 7A is located at a position further rearward than the output shaft (not shown) of the motor 7 and further frontward than the rotational shaft (not shown) of the rear wheels 6B. A pulley (not shown) is coaxially provided on the rotary blade 7A so as to be rotatable together with the rotary blade 7A. A belt (not shown) is looped around the pulley (not shown) of the motor 7 and the pulley (not shown) of the rotary blade 7A, so that rotation of the output shaft (not shown) of the motor 7 is transmitted to the rotary blade 7A via the belt (not shown) for rotating the rotary blade 7A.

As shown in FIG. 7, a terminal section 22D is provided on the top flat surface 22A of the housing 2. The terminal section 22D is connected to another end 44B of a second cord 44 to be described later. The terminal section 22D is located between one end sections 42A that are lower end sections of a pair of arm sections 42 to be described later. Further, a pair of engaging members 22E is provided on the top flat surface 22A so as to confront each other in the left-right direction. The engaging members 22E serve as latch receiving sections for engaging engaged sections 53 serving as latch sections provided on the inverter unit 5 as will be described later. Each of the engaging members 22E is a plate member extending in the front-rear direction. A through hole 22c is formed to penetrate each of the engaging members 22E in the plate thickness direction, so that a hook (a pressing piece 54 described later) of the engaged section 53 can catch the through hole 22c.

Further, the handle 4 is provided on the upper rear part of the housing 2. The handle 4 includes a holding section 41 held by a user of the power tool 1 and the pair of arm sections 42 extending in parallel with each other. A first end (base end) 42A of each of the arm sections 42 is coupled and connected to a part near the rear end of the upper section 22 of the housing 2. The arm sections 42 are pivotally movable about the coupled point between a rearward inclining state shown in FIG. 1 and a frontward folding state shown in FIG. 4, while maintaining parallel relationship with each other. Trajectories (loci) defined by pivotal movements of the pair of arm sections 42 are included in a pair of imaginary planes. Respective second ends 42B of the pair of arm sections 42 are coupled to respective ends of the holding section 41.

As shown in FIG. 2, the holding section 41 is provided with a main switch 41A and a safety lock switch 41B. Also, a first cord 43 and the second cord 44 are provided as a part of wiring connected to the main switch 41A and the safety lock switch 41B. One end 43A of the first cord 43 is connected to the holding section 41 so that the first cord 43 is electrically connected to the main switch 41A and the safety lock switch 41B. Another end 43B of the first cord 43 is selectively connectable to either one of: a power cord 81 (FIG. 1 etc.) serving as a first power cord extending from the inverter unit 5; and an extension cord (not shown) extending from an outlet of a commercial power source (not shown). FIG. 2 shows a state in which the another end of the first cord 43 is connected to the power cord 81. One end 44A of the second cord 44 is connected to the terminal section 22D provided at the housing 2. The another end 44B of the second cord 44 is connected to the holding section 41, and is electrically connected to the motor 7 and the first cord 43 via the main switch 41A and the safety lock switch 41B. If the main switch 41A becomes a pushed state by a user, the motor 7 is electrically connected to either the inverter unit 5 connected to the first cord 43 or the commercial power source (not shown) so that AC power is supplied. In order to protect the motor 7, the safety lock switch 41B automatically stops the motor 7 if foreign matters or the like twine around the rotary blade 7A and the rotary blade 7A stops. When starting work, the user operates (turns on) the safety lock switch 41B, and subsequently operates the main switch 41A to rotate the motor 7. If foreign matters twine around the rotary blade 7A, load will increase. At this time, the safety lock switch 41B is turned off (the power supply route to the motor 7 is shut off), thereby stopping the motor 7. After the safety lock switch 41B is operated, the motor 7 can be driven again by turning off the main switch 41A temporarily, turning on the safety lock switch 41B again, and operating the main switch 41A. In a state where the safety lock switch 41B is off, the main switch 41A cannot be operated (turned on) mechanically.

The inverter unit 5 is provided outside the housing 2 and on the top flat surface 22A so as to be detachable from the housing 2. In a state where the inverter unit 5 is fixed to the upper section 22, the inverter unit 5 is located at a position on the top flat surface 22A of the upper section 22 and directly above the rotary blade 7A during use of the power tool 1 shown in FIG. 1, that is, in a normal posture of the power tool 1. This position is further upward than the motor 7, further forward of the rear wall section 23, and further forward than the rear-wheel rotational axis (not shown). The projected position of the inverter unit 5 in the vertical direction is in a range from the rear-wheel rotational axis (not shown) to the front-wheel rotational axis (not shown). The position at which the inverter unit 5 is fixed to the top flat surface 22A is between the pair of imaginary planes including the trajectories formed when the pair of arm sections 42 is pivotally moved.

The inverter unit 5 includes a box-shaped casing 51, and also includes a well-known inverter (not shown) accommodated within the casing 51 and a battery pack 52. The inverter converts DC voltage outputted from the battery pack 52 to AC voltage, and supplied the motor 7 with AC power. A rail section 52A (FIG. 8(b)) extending in the vertical direction is provided at the front-side of the battery pack 52 in a state where the battery pack 52 is mounted on the inverter unit 5 shown in FIG. 1.

Figure 8A:
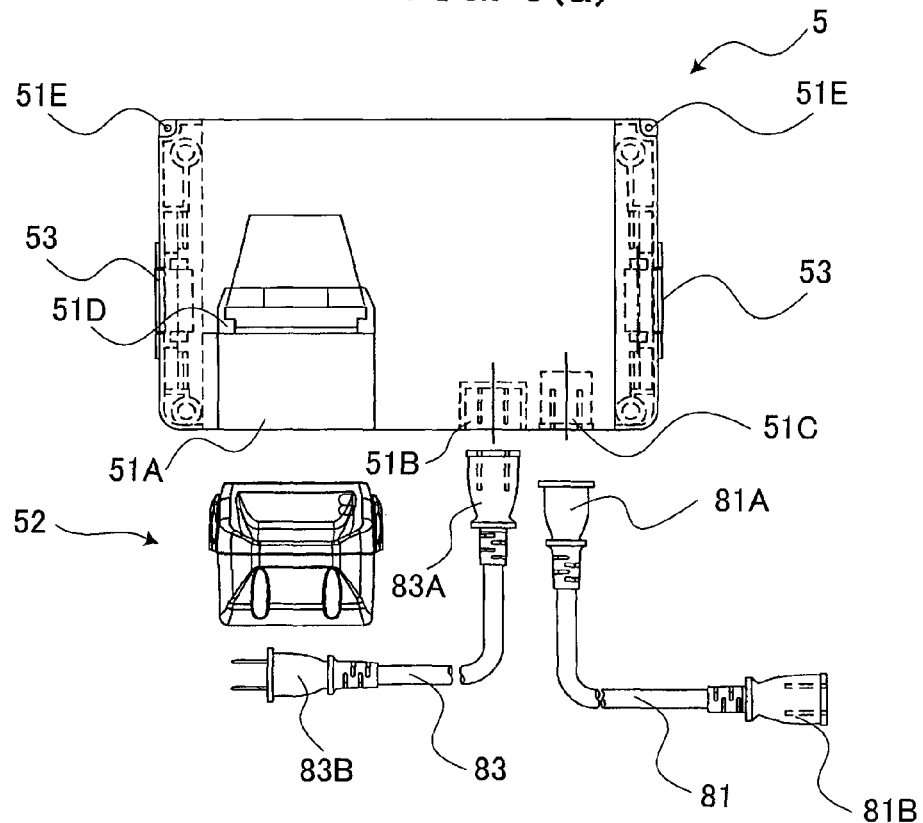
FIG. 8(a) is a plan view showing the inverter unit of the power tool according to the embodiment in a state where a battery pack, a power cord, and a charging cord separate from the inverter unit.
Figure 8B:
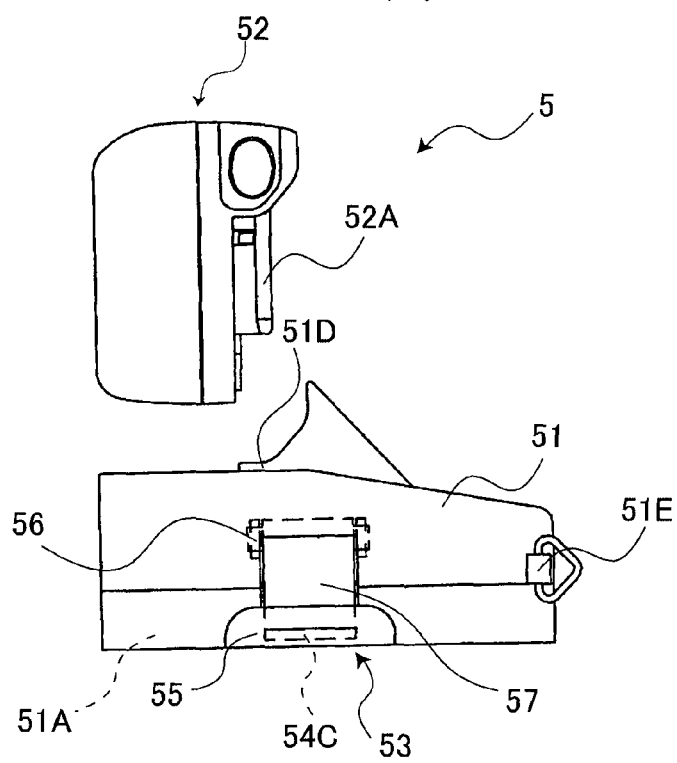
FIG. 8(b) is a side view showing the inverter unit of the power tool according to the embodiment in a state where the battery pack separates from the inverter unit.
Figure 8C:
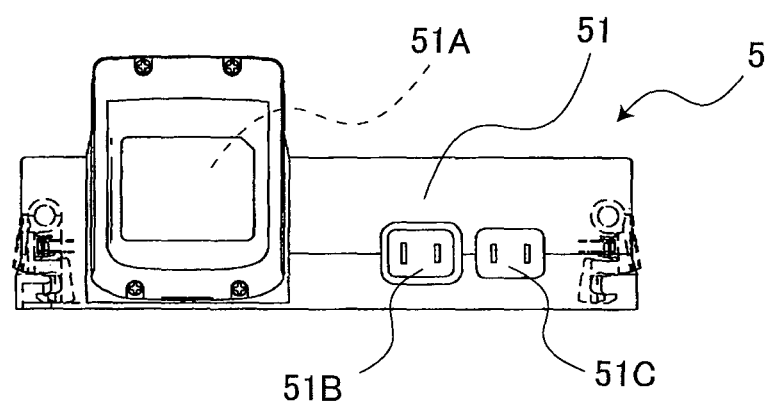
FIG. 8(c) is a rear view of the inverter unit of the power tool according to the embodiment.

As shown in FIGS. 8(a) through 8(c) etc., the casing 51 is provided, at its rear part, with a mount section 51A for inserting and detaching the battery pack 52, and an input plug 51B and an output plug 51C for supplying the motor 7 with power serving as parts of power-source supply section. The input plug 51B and the output plug 51C are arranged to be located between the arm sections 42 during use of the power tool 1, that is, at normal times. The mount section 51A includes a rail receiving section 51D for guiding the rail section 52A of the battery pack 52. The mount section 51A is provided with a terminal connecting to the terminal of the battery pack 52.

In order to mount the battery pack 52 on the casing 51, as shown in FIGS. 8(a) through 8(c), the user slidably moves the battery pack 52 downward in the mount section 51A so that the rail section 52A moves along the rail receiving section 51D, and pushes the battery pack 52 further downward in the mount section 51A until the battery pack 52 is fixed in the mount section 51A by a latch mechanism (not shown). By this operation, the inverter (not shown) and the battery pack 52 are electrically connected to each other. In this state, by connecting one end 83A of a charging cord 83 serving as a second power cord to the input plug 51B, and by connecting another end 83B of the charging cord 83 to the external power source (not shown), the battery pack 52 is supplied with power and charging is performed. Further, when one end 81A of the power cord 81 is connected to the output plug 51C, and also another end 81B of the power cord 81 is connected to the first cord 43, the motor 7 can be supplied with AC power obtained by converting DC power from the battery pack 52.

Figure 6:
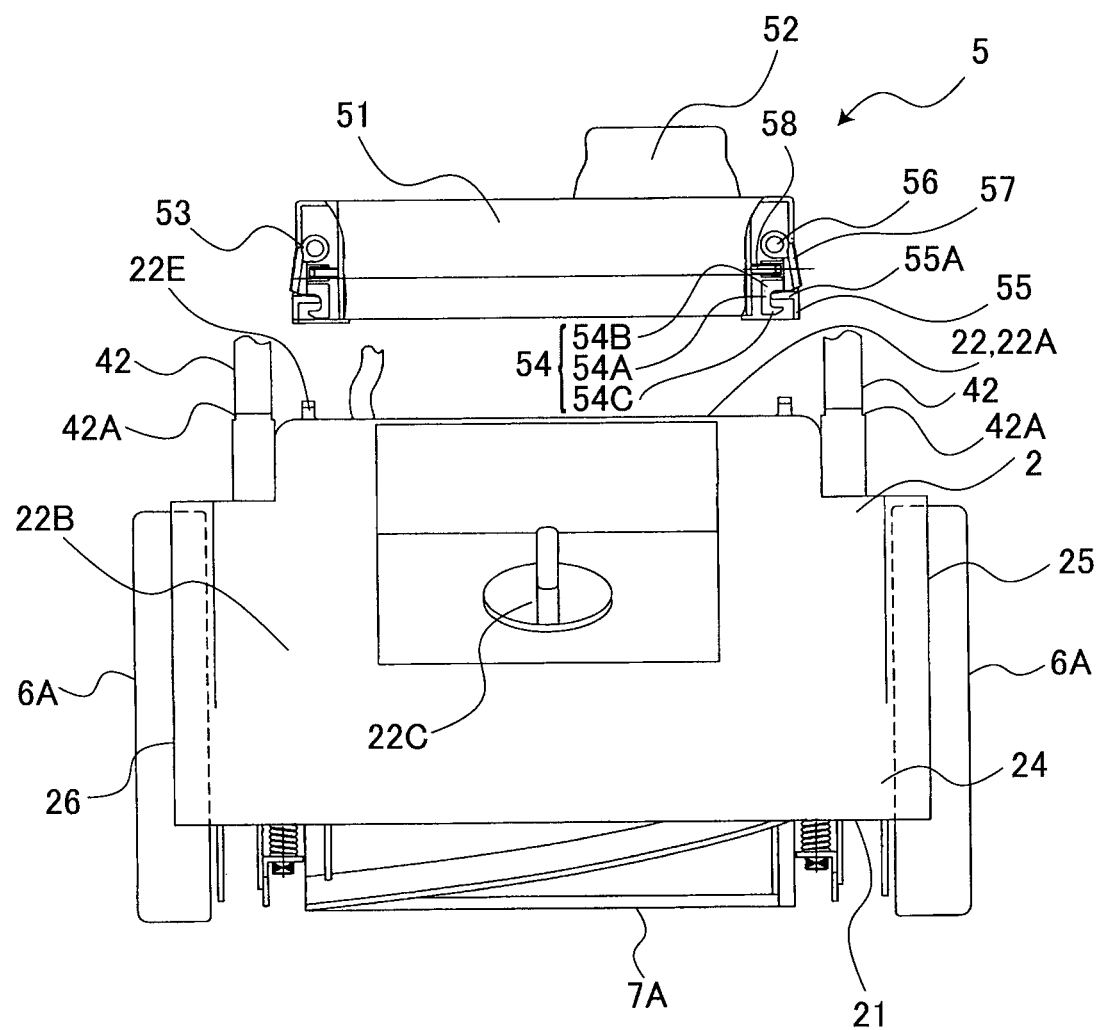
FIG. 6 is a front view of a part of the power tool according to the embodiment in a state where the inverter unit separates from the housing.

The engaged sections 53 are provided on both of the left and right side surfaces of the casing 51 at center portions in the front-rear direction. As shown in FIG. 6, each of the engaged sections 53 includes the pressing piece 54, a side wall 55, a lever pivot section 56 extending from the casing 51, a lever 57 provided to be pivotally movable about the lever pivot section 56, and a restricting section 58 that restricts pivotal movement of the lever 57.

The pressing piece 54 is a substantially squared-U shaped member, and has an upper end section 54B and a lower end section 54C both protruding from a base body 54A. The distance between the base body 54A and the side wall 55 is larger than the plate thickness of the engaging member 22E, whereas the distance between the lower end section 54C and the side wall 55 is smaller than the plate thickness of the engaging member 22E. In a state where the inverter unit 5 is detached from the housing 2 as shown in FIG. 6, the pressing piece 54 is pressed outwardly in the left-right direction by a spring (not shown), and the pressing piece 54 is supported by abutment of the base body 54A against a protruding section 55A protruding toward the base body 54A from the side wall 55. The lever 57 is pressed outwardly in the left-right direction by a spring (not shown) or the restricting section 58, and is supported by the casing 51 at a position away from the pressing piece 54 and the restricting section 58.

In order to mount the inverter unit 5 on the housing 2, the user presses the inverter unit 5 against the housing 2 in a state where the engaging member 22E and the engaged sections 53 confront each other, and then the engaging member 22E causes the lower end section 54C to move toward the center in the left-right direction against the pressing force of the spring (not shown), and enters a space between the base body 54A and the side wall 55. Then, the lower end section 54C fits in the through hole 22c (FIG. 5) of the engaging member 22E, and the inverter unit 5 is fixed onto the top flat surface 22A of the upper section 22. If the user (operator) pushes the lever 57 inwardly in the left-right direction against the pressing force of the spring (not shown) in a state where the inverter unit 5 is mounted on the housing 2, the pressing piece 54 moves inwardly in the left-right direction in conjunction with pivotal movement of the lever 57 or the restricting section 58, and the lower end section 54C comes out of the through hole 22c so as to release engagement with the engaging member 22E.

Figure 9A:
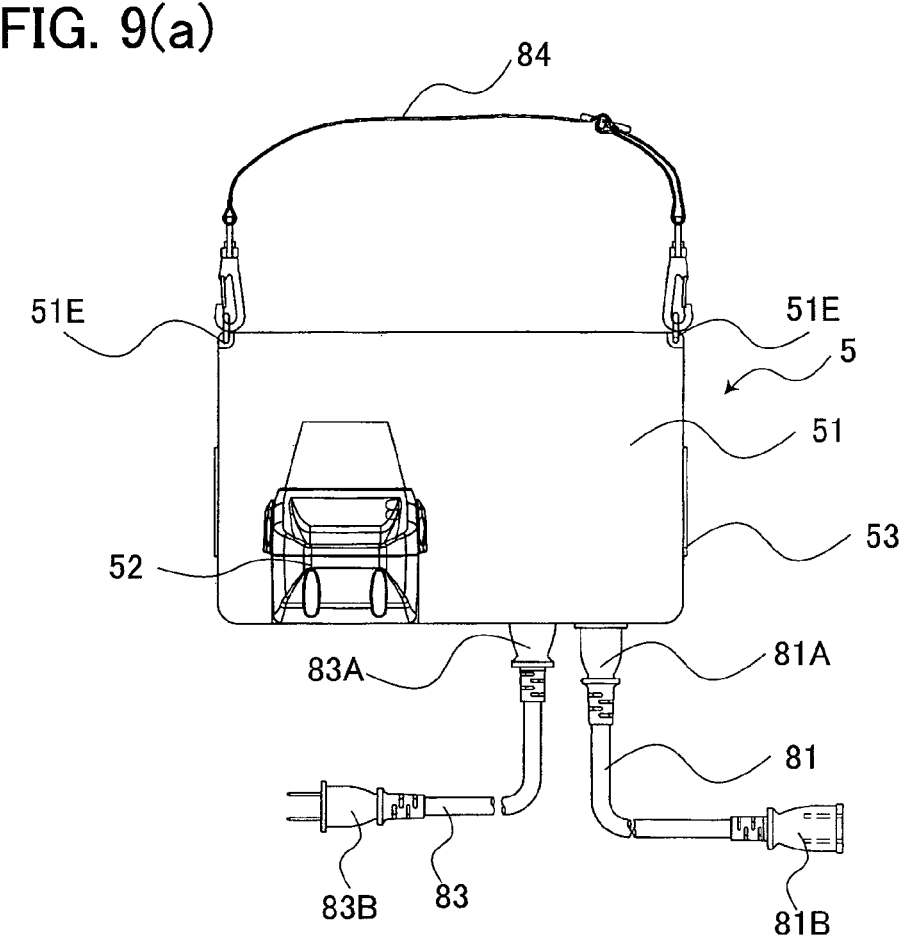
FIG. 9(a) is a plan view showing the inverter unit of the power tool according to the embodiment in a state where a belt is attached to the inverter unit and when the power cord and charging cord are connected to the inverter.
Figure 9B:
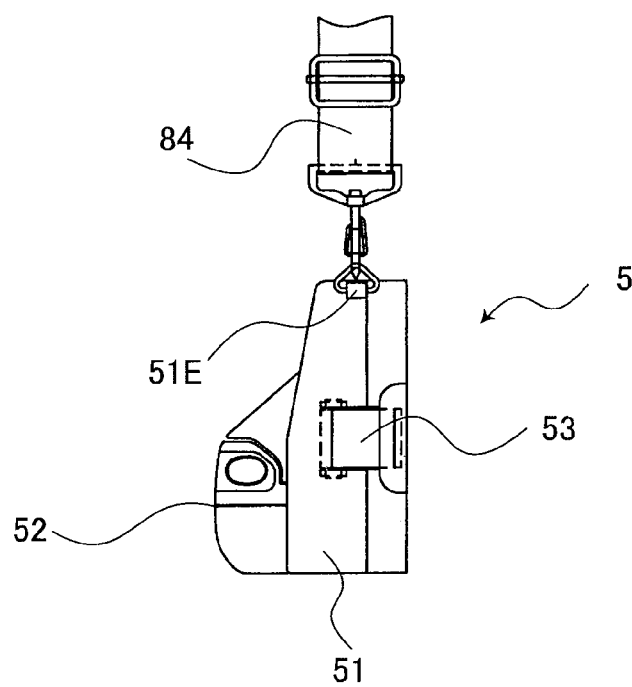
FIG. 9(b) is a side view showing the inverter unit of the power tool according to the embodiment in a state where the belt is attached to the inverter unit.
Figure 10A:
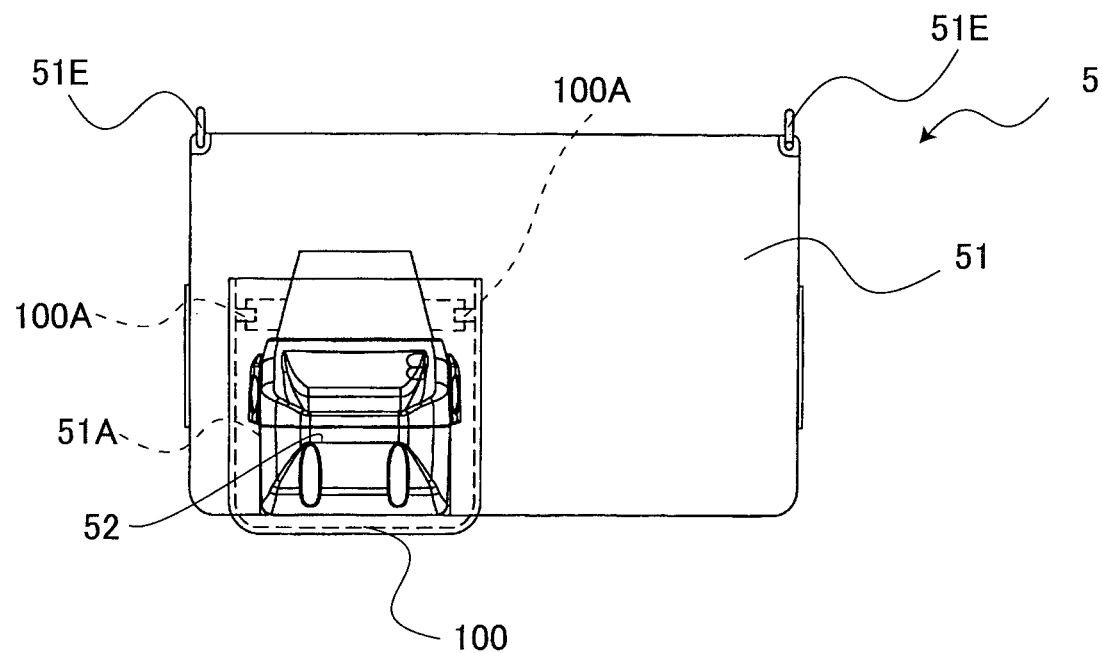
FIG. 10(a) is a plan view of an inverter provided on a power tool according to a first modification of the present invention.
Figure 10B:
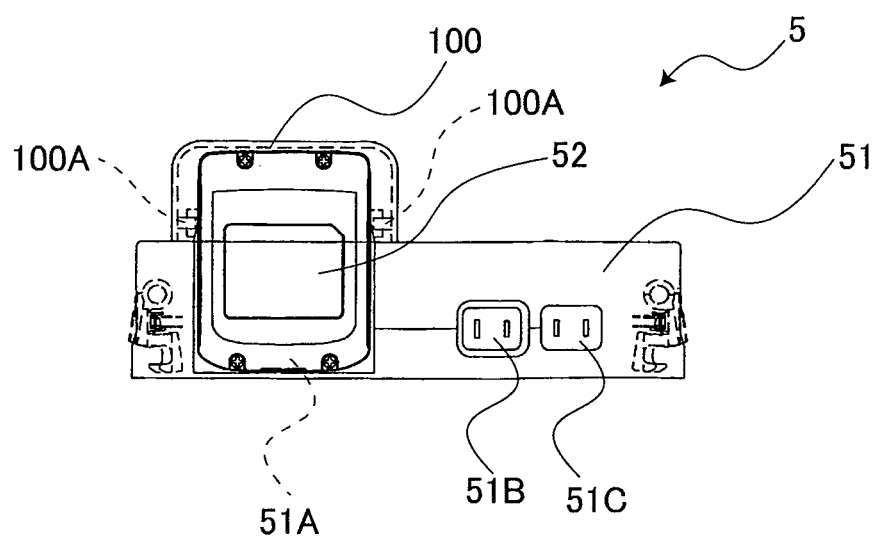
FIG. 10(b) is a rear view of the inverter of the power tool according to the first modification.
Figure 10C:
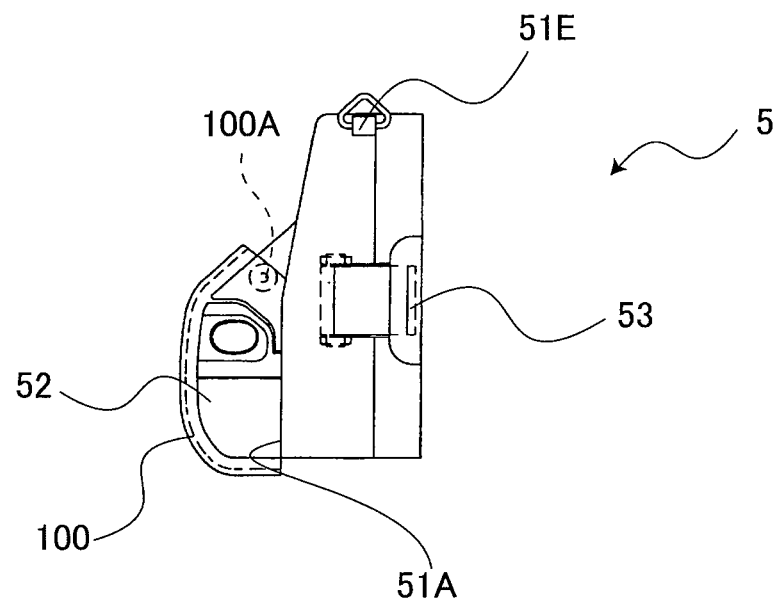
FIG. 10(c) is a side view of the inverter provided on the power tool according to the first modification.
Figure 10D:
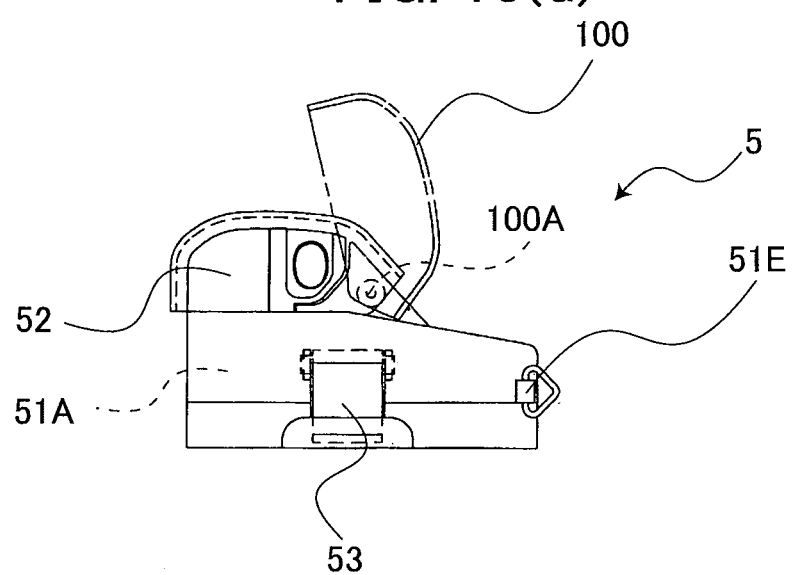
FIG. 10(d) is a side view of the inverter provided on the power tool according to the first modification showing open/cover operations of a cover of the inverter.

As shown in FIGS. 9(a) and 9(b), belt hook sections 51E are provided on front parts of the left and right side surfaces of the casing 51. The belt hook sections 51E are for using the inverter unit 5 in a state separated from the housing 2. By connecting hooks etc. of a belt 84 to the belt hook sections 51E, the user can carry the inverter unit 5 with the belt 84 on his shoulder or waist.

According to the above-described power tool 1, AC power can be supplied from the battery pack 52 to the motor 7 by connecting the first cord 43 to the power cord 81, without connecting to an external AC power source via an extension cord (not shown). Hence, the power tool 1 can be used even at locations away from an external AC power source. Additionally, even in a situation where work is done near the external power source, if the first cord 43 is connected to the power cord 81, the user is not bothered by the extension cord (not shown) during work, thereby improving operability.

If the power tool 1 is used near AC power source, the first cord 43 may be connected to the extension cord (not shown) so that AC voltage can be supplied directly from the external power source to the motor 7. Because the inverter unit 5 is not used in this case, the entire power tool 1 can be lightweight by detaching the inverter unit 5, thereby improving operability. In this case, the inverter unit 5 and the battery pack 52 can be used with another power tool.

The inverter unit 5 is fixed to the housing 2 by the engaging member 22E and the engaged sections 53, thereby preventing the inverter unit 5 from dropping off and from being electrically disconnected during use of the power tool 1. Because the latch mechanism by the engaging member 22E and the engaged sections 53 is adopted, the user can mount and dismount the inverter unit 5 easily.

Because the arm sections 42 pivotally moves relative to the housing 2, the holding section 41 can be oriented at a position that is easy for the user to work. Further, the inverter unit 5 is arranged between the pair of imaginary planes including the trajectories formed when the pair of arm sections 42 is pivotally moved, which prevents the inverter unit 5 and the arm sections 42 from contacting each other and being broken when the arm sections 42 are pivotally moved.

The inverter unit 5 is arranged between the one end sections 42A of the pair of arm sections 42 on the top flat surface 22A. Thus, when the arm sections 42 are pivotally moved about the one end sections 42A relative to the housing 2, the second cord 44 extending from the terminal section 22D to the holding section 41 can be pivotally moved together with the arm sections 42, thereby preventing the second cord 44 from being broken or disconnected during the pivotal movement.

Because the battery pack 52 is detachable from the inverter unit 5, it is not necessary to carry the inverter unit 5 together with the battery pack 52 to a charging place when the charging-type battery pack 52 is to be charged. In addition, the battery pack 52 can be used for another power tool.

Because the mount section 51A has the rail receiving section 51D that receives the rail section 52A of the battery pack 52, the battery pack 52 can be mounted on the inverter unit 5 easily.

The user can carry the inverter unit 5 separate from the housing 2. Hence, the inverter unit 5 can be carried in a detached state from the housing 2, thereby making the weight of the housing 2 and its attachment lighter and improving operability. For example, mowing work can be performed by putting the inverter unit 5 on the user's shoulder. Additionally, the inverter unit 5 can be used by itself.

The inverter unit 5 is provided with the belt hook sections 51E for using the inverter unit 5 separate from the housing 2. Thus, the belt 84 or the like can be attached to the inverter unit 5 when the inverter unit 5 is used by itself, which improves operability.

Because the output plug 51C of the inverter unit 5 is provided on a surface different from the engaged sections 53, the power cord 81 of the power tool 1 does not hinder mounting and dismounting of the inverter unit 5.

The output plug 51C is positioned between the arm sections 42 when the arm sections 42 are at the normal state, which suppresses an unexpected detachment of the power cord 81 from the output plug 51C.

The output plug 51C and the belt hook sections 51E are provided on different surfaces. Hence, when the user carries and uses only the inverter unit 5, the belt 84 and the power cord 81 do not get in the way each other. Specifically, the output plug 51C is located at a lower position of the inverter unit 5. Hence, when the belt 84 is attached to the belt hook sections 51E for carrying the inverter unit 5, the power cord 81 connected to the output plug 51C does not get in the way. Further, the power cord 81 for outputting AC power is detachably connected to the output plug 51C, and the charging cord 83 connected to the external power source is detachably connected to the input plug 51B. Thus, the power cord 81 and the charging cord 83 can be connected and disconnected depending on usage conditions of the inverter unit 5, and the user is not bothered by the power cord 81 and the charging cord 83, thereby improving operability. For example, if the charging cord 83 is not necessary, the charging cord 83 can be detached from the inverter unit 5. Hence, the user is not subject to restrictions on work area.

The inverter unit 5 is disposed at an upper position higher than the motor 7, which prevents the inverter unit 5 from being hit by another object during use. Especially, in a case of a lawnmower, the lower section 21 confronts the ground surface during use of the lawnmower. Thus, if the inverter unit 5 is provided on the lower section 21, there is possibility that the inverter unit 5 hits the ground surface, stones, and the like. This can be avoided according to the above-described embodiment. Further, when maintenance work is performed for the inverter unit 5, the motor 7 does not get in the way. Further, if the inverter unit 5 is detachable from the housing 2, mounting and dismounting of the inverter unit 5 can be made easy. In addition, if the motor 7 and the rotary blade 7A have relatively large weight, weight balance can be improved even if the inverter unit 5 has a relatively large weight.

Because the inverter unit 5 is located directly above the rotary blade 7A, the rotary blade 7A can be urged downward by the inverter unit 5 having a relatively large weight. Especially, in a case of a lawnmower, this can prevent the rotary blade 7A from lifting from the ground surface, and prevent the rotary blade 7A from becoming unstable during lawn mowing.

The inverter unit 5 is located at a position further forward than the rear wall section 23 and further forward than the rear-wheel rotational axis (not shown). The projected position of the inverter unit 5 in the vertical direction is in a range from the rear-wheel rotational axis (not shown) to the front-wheel rotational axis (not shown).

This feature can suppress falling over of the power tool 1 rearward due to a relatively large weight of the inverter unit 5. Especially, in a case of a lawnmower, the power tool 1 is sometimes leaned rearward in order to adjust cutting depth into lawn. In such a situation, the above-described feature can effectively suppress falling over of the power tool 1 rearward.

The inverter unit 5 is fixed on the top flat surface 22A of the upper section 22. Thus, the inverter unit 5 can be arranged at a position away from a part where the adjustment knob 22C for adjusting cutting depth is provided, which enables effective utilization of dead space.

The part of the upper section 22 at which the engaging member 22E is provided is further forward than the pivotal axis of the one end section 42A of the arm section 42. Hence, when engagement/disengagement of the engaging member 22E to/from the engaged section 53 during use of the power tool 1, the arm sections 42 can be prevented from hindering engagement/disengagement work.

While the invention has been described in detail with reference to the above aspects thereof, it would be apparent to those skilled in the art that various changes and modifications may be made therein without departing from the scope of the claims. For example, in a first modification of the embodiment as shown in FIGS. 10(a) through 10(d), the inverter unit 5 may include a cover 100 that covers the battery pack 52 and the mount section 51A. The cover 100 is provided at an upper part of the casing 51. According to the first modification, the battery pack 52 and the mount section 51A can be protected from dusts and the like. In FIGS. 10(a) through 10(d), the cover 100 is configured to pivotally move about pivotal supports 100A. Further, for example, a latch mechanism for fixing the cover 100 to the casing 51 of the inverter unit 5 may be provided, so that the cover 100 does not open due to vibrations or the like during use of the power tool and the battery pack 52 can be maintained in a covered state by the cover 100.

In the above-described embodiment and the first modification, a single battery pack 52 is mounted on the mount section 51A. However, the mount section may be so configured that a plurality of battery packs 52 can be mounted thereon. According to this configuration, power can be supplied for a longer period by using the plurality of battery packs 52 sequentially, compared with the case where the single battery pack 52 is mounted.

In the above-described embodiment and the first modification, the latch mechanism including the engaging member 22E and the engaged section 53 is adopted as fixing means for fixing the inverter unit 5 to the housing 2. However, another configuration may be adopted. For example, a latch section may be provided on the housing 2 and a latch receiving section may be provided on the inverter unit 5. Further, the inverter unit 5 and the housing 2 may be fixed by a band, or a locking switch for restricting movement of the pressing piece 54 may be provided on the holding section 41. Further, the inverter unit 5 may be fixed to the housing 2 by a sliding mechanism, or may be fixed to the housing 2 by an insertion mechanism.

In the above-described embodiment and the first modification, the battery pack 52 is guided to the mount section 51A by sliding along the rail. However, the battery pack 52 may be guided to the mount section 51A by an insertion mechanism. Further, connection between the battery pack 52 and the inverter unit 5 (the mount section 51A) may be done only by sliding, without using the latch mechanism.

The position at which the inverter unit 5 is arranged is not limited to the position of the inverter unit 5 in the above-described embodiment and the first modification. For example, the inverter unit 5 is arranged directly above the rotary blade 7A in the above-described embodiment, but the position of the inverter unit 5 is not limited to directly above the rotary blade 7A. For example, the projected position of the inverter unit 5 in the vertical direction may be in a range from the motor 7 to the rotary blade 7A.

The lever 57 and the pressing piece 54 of the engaged section 53 shown in FIG. 6 may be formed as an integral part. In this case, the engaged section 53 is urged outwardly in the left-right direction by a spring (not shown). It is so configured that the lever 57 pivotally moves about the lever pivot section 56 when the engaged section 53 (the lever 57) is pressed against the urging force of the spring. Further, a tapered section may be provided at the lower end section 54C of the pressing piece 54. In this case, the tapered section can be provided so that, when the inverter unit 5 is mounted on the housing 2, the tapered section abuts on the engaging member 22E without operating the engaged section 53 and the lower end section 54C moves inwardly in the left-right direction.

In the above-described embodiment and the first modification, the through hole 22c is formed in the engaging member 22E. However, another shape may be used as long as the above-described pressing piece 54 can engage. For example, a concave and convex shape may be used instead of the through hole.

Figure 11:
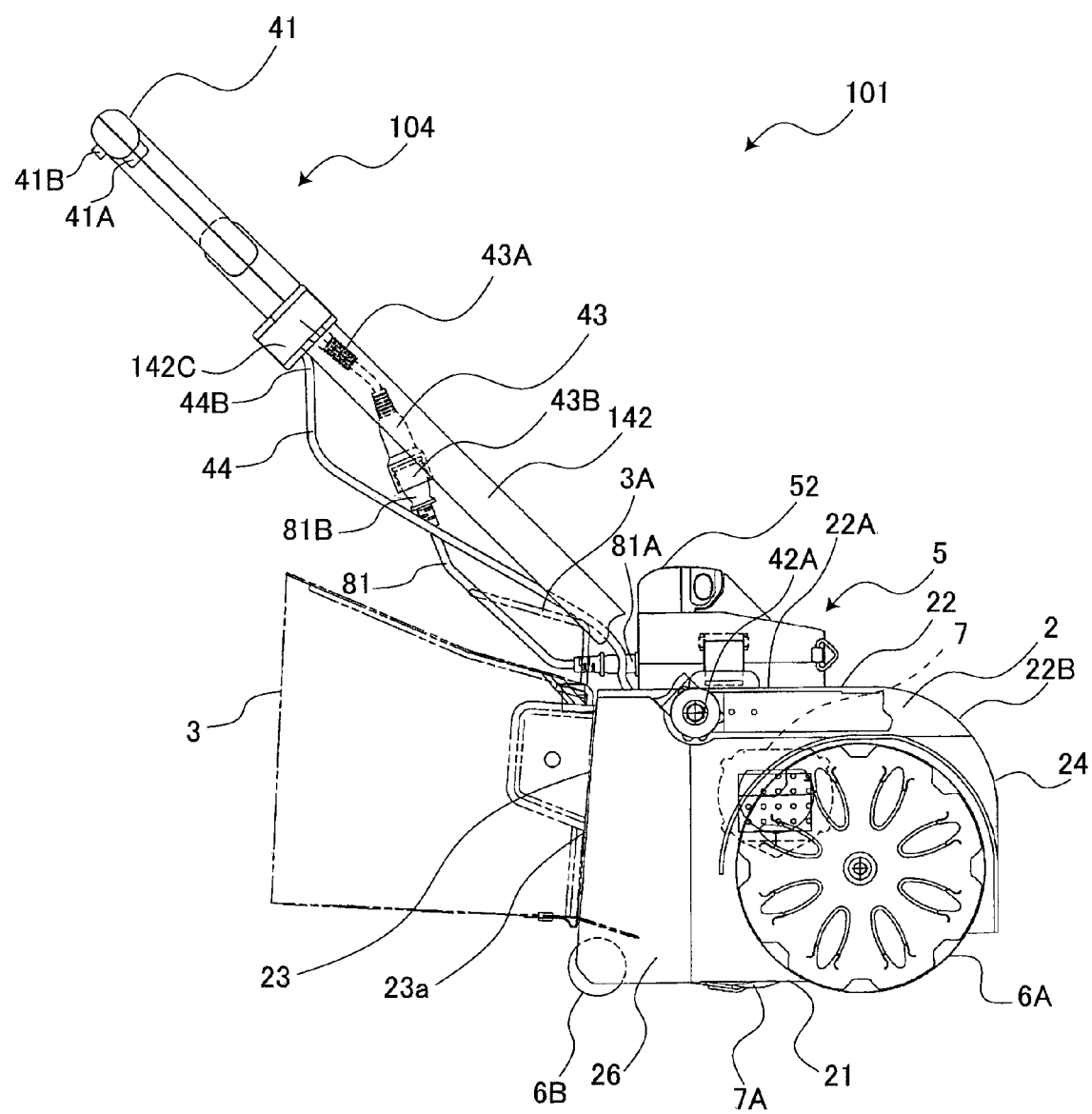
FIG. 11 is a side view of a power tool according to a second modification of the present invention.

The pair of arm sections 42 may be so configured that its lengthwise size can be adjusted. For example, as shown in FIG. 11, an arm section 142 of a power tool 101 according to a second modification may include an adjustment member 142C. The length of the arm section 142 can be fixed by adjusting the pair of arm section 142 to a desired length and subsequently rotating the adjustment member 142C. Here, it may be also configured such that the length of the arm section 142 can be adjusted finely by rotating the adjustment member 142C.

INDUSTRIAL APPLICABILITY

A power tool of the invention is especially useful in a field of mowers and the like that are used at outdoor places away from outlets.

REFERENCE SIGNS LIST 1, 101 power tool
2 housing
4, 104 handle
5 inverter
6A front wheel
6B rear wheel
7 motor
7A end tool
21 lower side portion
22 upper side portion
22A uppermost surface
22E engaging members
23 rear wall section
24 front wall section
41 holding section
42, 142 arm sections
42A one end of arm section
42B another end of arm section
52 battery pack
53 engaged sections

The invention claimed is:

1. A power tool comprising:
a housing having an upper side portion, a lower side portion, a front part, and a rear part; a first direction being oriented from the lower side portion towards the upper side portion; a second direction being oriented from the rear part towards the front part, perpendicular to the first direction, and parallel to a traveling direction of the power tool;
an alternating-current (AC) motor supported by the housing and driven by alternating-current power;
an end tool supported by the housing and rotatably driven by the AC motor;
a battery pack that outputs direct-current voltage;
an inverter casing attachable to and detachable from the upper side portion, the inverter casing including a mount section, the battery pack being attachable to and detachable from the mount section;
an inverter accommodated in the inverter casing and configured to convert the direct-current voltage outputted from the battery pack into AC voltage and to supply the AC motor with AC power when the inverter casing is attached to the upper side portion so that the upper side portion is disposed between the inverter casing and the AC motor relative to the first direction; and
an AC power input selectively connectable to an extension cord connected to an external AC power source to supply AC power received from the extension cord to the AC motor for operation of the power tool when the inverter casing is detached from the upper side portion.

2. The power tool according to claim 1, wherein the inverter casing is located between the AC motor and the end tool relative to the second direction.

3. The power tool according to claim 1, wherein the inverter casing is located in the first direction from the end tool.

4. The power tool according to claim 1, wherein the front part has a front wall section and the rear part has a rear wall section; and
wherein the inverter casing is offset from the rear wall section toward the front wall section relative to the second direction.

5. The power tool according to claim 1, further comprising:
at least one front wheel rotatably supported by the front part and rotatable about a front rotational axis; and
at least one rear wheel rotatably supported by the rear part and rotatable around a rear rotational axis, the inverter casing being offset from the rear rotational axis toward the front rotational axis relative to the second direction.

6. The power tool according to claim 5, wherein the inverter casing is located between the rear rotational axis and the front rotational axis relative to the second direction.

7. The power tool according to claim 1, wherein the upper side portion of the housing has an uppermost surface on which the inverter casing is mounted.

8. The power tool according to claim 1, further comprising:
a holding section configured to be held by a user; and
a pair of arm sections each having a base end pivotally connected to the housing and another end connected to the holding section so that the pair of arm sections are pivotally movable relative to the housing, pivotal movement of the pair of arm section defining loci, and a pair of imaginary planes including the loci; and
wherein the inverter casing is disposed between the pair of imaginary planes.

9. The power tool according to claim 8, wherein:
the pair of arm sections is pivotally moveable relative to the housing about a pivotal axis of the pivotal movement of the pair of arm sections;
the upper side portion of the housing is provided with an engaging section;
the inverter casing is provided with an engaged section engageable with the engaging section to fix the inverter casing to the upper side portion; and
the pair of arm sections extends in a diagonal direction coplanar with the first direction and the second direction, the diagonal direction forming an acute angle relative to the first direction and an obtuse angle relative to the second direction, the engaging section being offset from each base end of each arm section relative to the second direction toward the front part.

10. The power tool according to claim 1, further comprising an inverter power outlet for outputting AC power from the inverter, wherein the AC power input is selectively connectable to the inverter power outlet to supply AC power received from the inverter to the AC motor for operation of the power tool when the battery pack is attached to the inverter casing and the inverter casing is attached to the upper side portion.

11. A power tool comprising:
- a housing;
- an alternating-current (AC) motor supported by the housing and driven by alternating-current power;
- an end tool supported by the housing and rotatably driven by the AC motor;
- a battery pack that outputs direct-current voltage;
- an inverter casing attachable to and detachable from the housing, the inverter casing including a mount section, the battery pack being attachable to and detachable from the mount section;
- an inverter accommodated in the inverter casing, the inverter being configured to convert the direct-current voltage outputted from the battery pack into AC voltage when the inverter casing is attached to the housing, and to supply the AC motor with AC power; and
- an AC power input selectively connectable to an extension cord connected to an external AC power source to supply AC power received from the extension cord to the AC motor for operation of the power tool when the inverter casing is detached from the housing.

12. The power tool according to claim 11, further comprising an inverter power outlet for outputting AC power from the inverter, wherein the AC power input is selectively connectable to the inverter power outlet to supply AC power received from the inverter to the AC motor for operation of the power tool when the battery pack is attached to the inverter casing and the inverter casing is attached to the housing.

* * * * *